United States Patent [19]
LeMole et al.

[11] Patent Number: 6,009,410
[45] Date of Patent: Dec. 28, 1999

[54] METHOD AND SYSTEM FOR PRESENTING CUSTOMIZED ADVERTISING TO A USER ON THE WORLD WIDE WEB

[75] Inventors: Suzanne L. LeMole, Murray Hill; Steven Howard Nurenberg, Manalapan, both of N.J.; Joseph Thomas O'Neil, Staten Island, N.Y.; Peter H. Stuntebeck, Little Silver, N.J.

[73] Assignee: AT&T Corporation, New York, N.Y.

[21] Appl. No.: 08/951,298

[22] Filed: Oct. 16, 1997

[51] Int. Cl.[6] ...................................................... G06F 17/60
[52] U.S. Cl. ................................ 705/14; 705/1; 707/102; 709/219; 379/201; 348/8
[58] Field of Search .................................. 705/1, 14, 10; 707/102; 709/219; 379/201; 348/8; 455/4.2

[56] References Cited

U.S. PATENT DOCUMENTS

| | | | |
|---|---|---|---|
| 5,661,516 | 8/1997 | Carles ........................................... | 348/8 |
| 5,717,923 | 2/1998 | Dedrick ...................................... | 707/102 |
| 5,754,938 | 5/1998 | Herz et al. ................................. | 455/4.2 |
| 5,793,972 | 8/1998 | Shane ......................................... | 709/219 |
| 5,848,396 | 12/1998 | Gerace ....................................... | 705/10 |
| 5,850,433 | 12/1998 | Rondeau .................................... | 379/201 |

OTHER PUBLICATIONS

DR–Link, ZD Net Free Personalzed News on Internet, pp. 1–2, Oct. 13, 1995.
Dr–Link, Companies Eye Lucrative Niche in Targeting ADs, Personalizing Content in Potentially Huge Web Market. Interactive Daily. Nov. 8, 1996, pp. 1–3.

Primary Examiner—Allen R. MacDonald
Assistant Examiner—M. Irshadullah

[57] ABSTRACT

A customized advertising repository server is connected on the World Wide Web (WWW), which can be accessed by a registered user through his or her browser either by clicking on an icon, or by inputting the specific URL address of the particular server which stores that user's advertising repository. When the user accesses his or her customized ad repository through the browser, a composite advertising page is dynamically configured by the Customized Advertising Repository (CAR) server for that particular user based on that user's previously provided user profile. Furthermore, at least a portion of that composite advertising page can be dynamically configured on a context dependent basis determined from the particular Web site or sites that the user has accessed prior to accessing the CAR. The dynamically configured composite page or pages of advertising provided to the user may contain plural static images, streaming banners, 3-D images, animation, video and/or audio clips, using any of the technologies available on the Web for presenting textual and/or visual information. Such a composite page or pages is configured from a database which stores such images, banners, animation, etc., from plural advertisers. The customized page is created by selecting from among a storehouse of plural different subscribing advertisers and their associated banner ads, images, etc., those particular images, etc. that will be elements of the customized page based on the user's specific areas of interest as determined from the profile, and/or the context dependency. From such dynamically configured composite page or pages, the user can then click on a particular image, video window, banner, etc., to retrieve, through a hyperlink, further information directly from the selected advertiser's own Web site or mirror Web site.

20 Claims, 4 Drawing Sheets

FIG. 2

CUSTOMIZED AD REPOSITORY REGISTRATION FORM

NAME: ☐    HOME ZIP CODE: ☐
AGE: ☐

INTERESTS:
☐ ART
☐ AUTOMOBILES
☐ COMPUTERS
☐ FASHION
☐ FOOD
☐ KIDS
☐ MOVIES
☐ TELEVISION
☐ TRAVEL
☐ SHOPPING
☐ THEATER
☐ SPORTS

SUBMIT

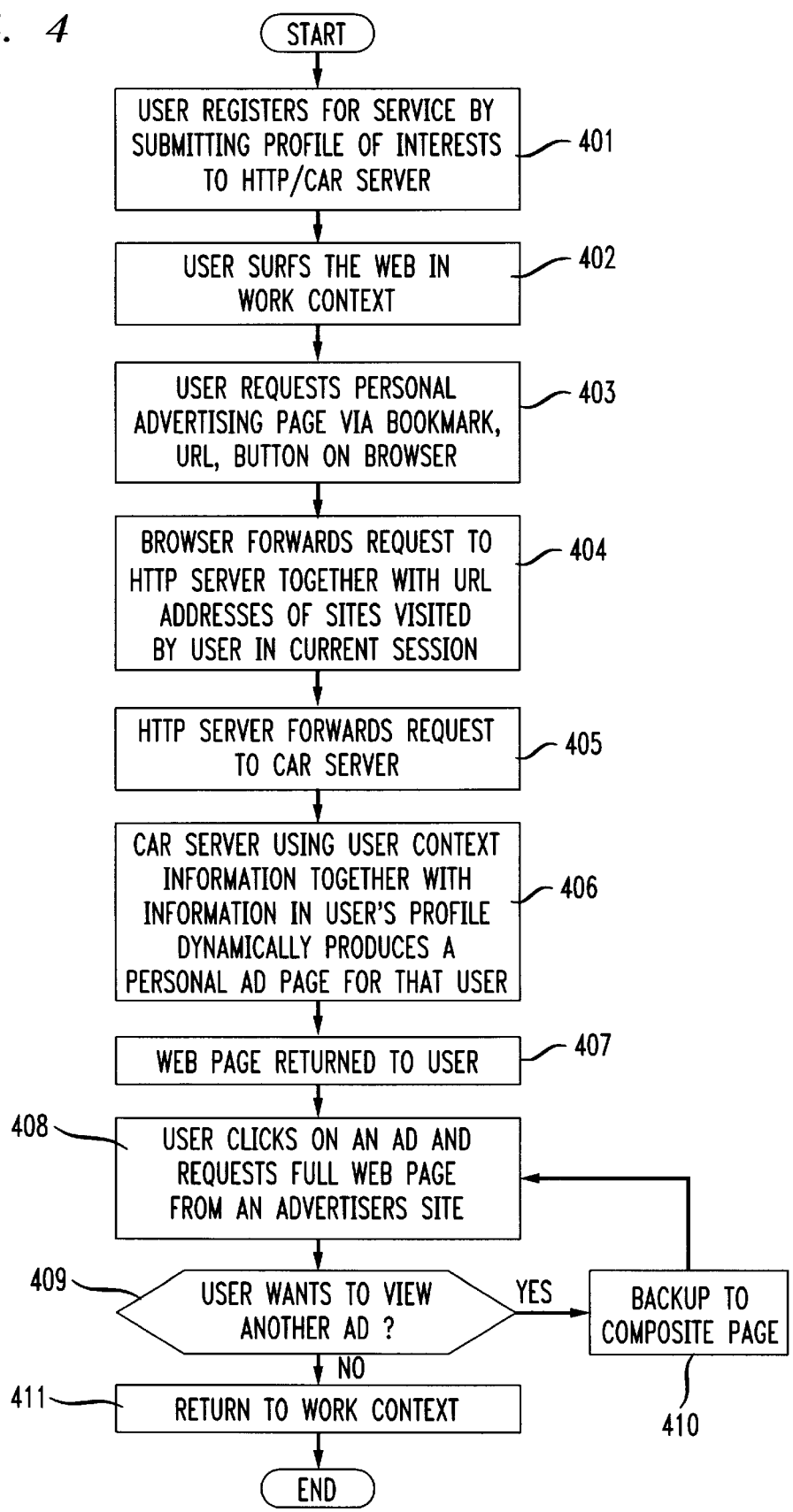

METHOD AND SYSTEM FOR PRESENTING CUSTOMIZED ADVERTISING TO A USER ON THE WORLD WIDE WEB

TECHNICAL FIELD

This invention relates to the World Wide Web, and more particularly, to a method and system for presenting customized advertising to a user on the Web.

BACKGROUND OF THE INVENTION

As the World Wide Web steadily becomes an increasingly more popular gateway for accessing sources of information, entertainment, shopping, and various interactive services to millions of users around the world, information providers which supply such information, entertainment, goods and interactive services via HTML-formatted pages have taken advantage of the captured nature of the Web users who access its Web site by "selling" part of the "real estate" on its pages to advertisers who may advertise products or services that may or may not be related to the content or nature of the site. Currently, many of the pages provided by information providers contain advertising that takes various forms such as banner ads across the top or bottom of a page. Such ads may include scrolled information containing images that change with time. Disadvantageously, from an advertiser's perspective, Web users have a tendency to mentally "tune-out" such advertising as they read or interact with the information displayed on the main work area of a page. Furthermore, by utilizing a portion of the valuable "real estate" on a Web page for advertising, the remaining available work area on the page is reduced from its maximum full-screen capabilities. Techniques currently also exist for streaming both audio and video across the Internet. Such an audio component can be incorporated as part of the information content of a Web page as well as part of the accompanying advertising, thereby leading to a potential conflict between the audio components of each. Also, since the size of the ad itself on the Web page is limited to only a small portion of the entire page, the full capabilities that could be presented to a Web user through that ad cannot be fully deployed for their maximum visual impact. An example of the latter is holographic 3D experiences that are currently evolving on the Web.

Technologies currently exist which deliver information and advertising to users through a screen saver during periods in which the user is not accessing the Web, or not using his or her terminal for other purposes. The user, however, may not be there to see the information when it is downloaded. Thus, as with a television commercial which more often than not is presented to an empty room or to a disinterested viewer, advertising on the Web as it is currently presented to a user are not likely to achieve the advertiser's desired impact.

SUMMARY OF THE INVENTION

In accordance with the present invention, a customized advertising repository server is connected on the World Wide Web (WWW), which can be accessed by a registered user through his or her browser either by clicking on an icon, or by inputting the specific URL address of the particular server which stores that user's advertising repository. When the user is interacting on the Web in a usual manner retrieving information for business or personal reasons, he or she may desire a break from those browsing activities. Although accessing a general advertising site may not be a browsing activity that a user would frequently or even periodically pursue, the ability to view advertising that is specifically geared to that user's individual interests is more likely to be attractive to a user and, with proper incentives, an activity the user will voluntarily pursue. Further, the user may in fact be stimulated to exit his work context mode in which he or she is normally browsing and enter a commercial context mode to view advertising for financial incentives, such as being presented with special offers and/or discounts that are only available to that user through such a customized advertising repository server, or through other incentives, as an example, which tie the accessing of the customized advertising repository with reduced Internet access charges. In accordance with the invention, when the user accesses his or her customized ad repository through the browser, a composite advertising page is dynamically configured by the Customized Advertising Repository (CAR) server for that particular user based on that user's previously provided user profile. Furthermore, at least a portion of that composite advertising page can be dynamically configured on a context dependent basis determined from the particular Web site or sites that the user has accessed prior to entering the commercial context mode. This context dependency that links the advertising presented to the user by the CAR to the Web site or sites previously accessed by the user can be based on key words associated with just the site accessed immediately prior to entering the commercial context mode. Alternatively, the advertising can be linked with key words associated with a plurality of previously accessed sites. The dynamically configured composite page or pages of advertising provided to the user may contain plural static images, streaming banners, 3-D images, animation, video and/or audio clips, using any of the technologies available on the Web for presenting textual and/or visual information. Such a composite page or pages is configured from a database which stores such images, banners, animation, etc., from plural advertisers. The customized page is created by selecting from among a storehouse of plural different subscribing advertisers and their associated banner ads, images, etc., those particular images, etc. that will be elements of the customized page based on the user's specific areas of interest as determined from the profile, and/or the context dependency. From such dynamically configured composite page or pages, the user can then click on a particular image, video window, banner, etc., to retrieve, through a hyperlink, further information directly from the selected advertiser's own Web site or mirror Web site.

Since the dynamically created advertising page or pages that is/are downloaded contain advertising material that is specifically customized to the user's interests, and which are updated regularly by the customized advertising repository server, the user is induced to periodically access his or her customized advertising repository to view the current offers presently being advertised and promoted, and which because of the customization to the individual user have a higher than average probability of being of interest to the user.

BRIEF DESCRIPTION OF THE DRAWINGS

FIG. 2 shows an exemplary profile registration form which is downloaded to a user's terminal, completed by the user, and returned to the HTTP server and CAR server for processing and subsequent dynamic formulation of a composite page that is customized for that user to advertise goods and services that are likely to be of interest to that user based on the user's expressed areas of interest and demographic data of that user as provided in the profile;

FIG. 4 is a flowchart of the steps associated with a context dependent embodiment of the present invention.

DETAILED DESCRIPTION

Figure 1:
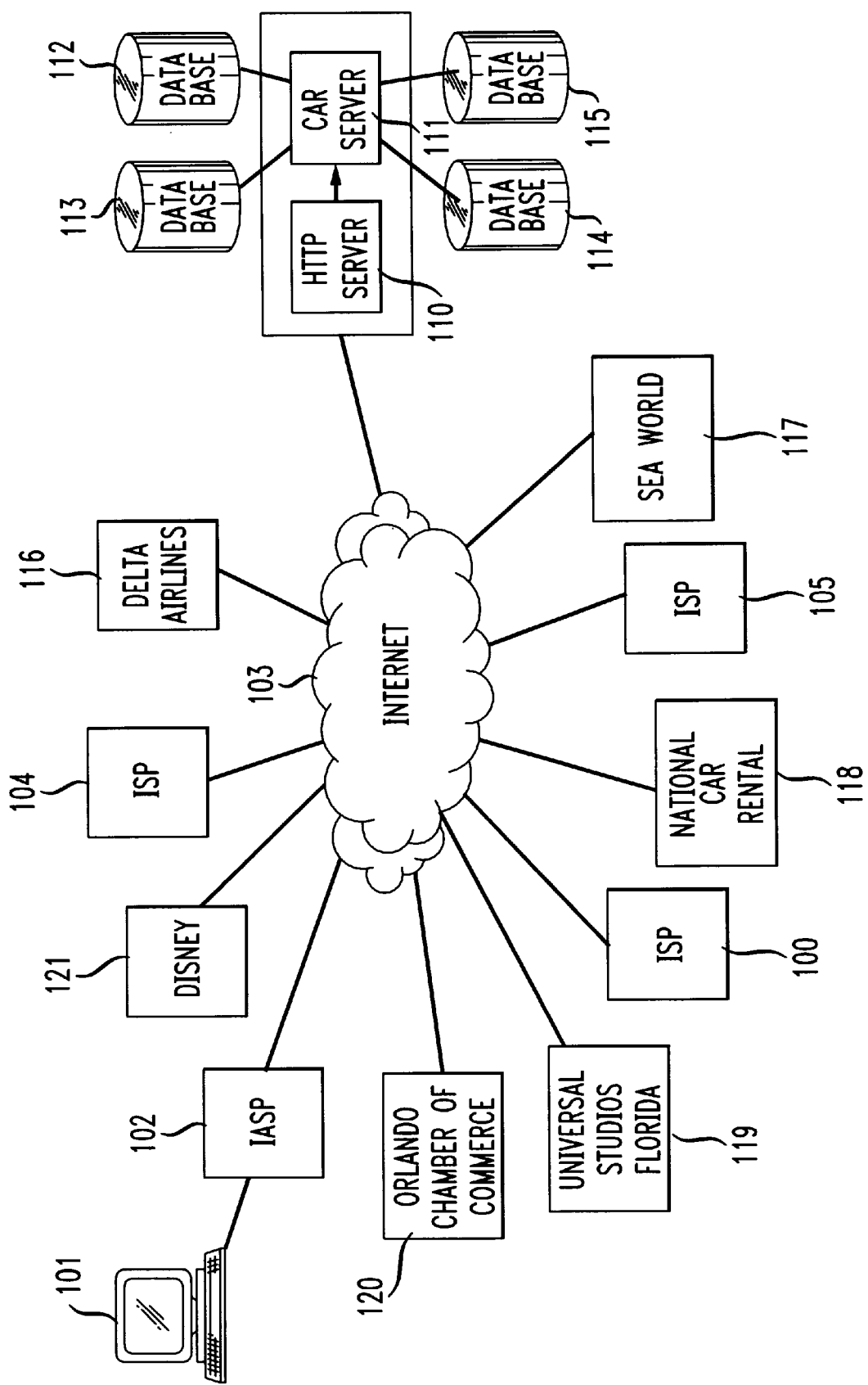
FIG. 1 is a block diagram of a telecommunications system in which a user is connected through his or her client terminal to the Internet for accessing various Web sites through the terminal's browser program; and through this browser the user also interacts with an HTTP server and a Customized Advertising Repository (CAR) server, the latter which configures an advertising page that is customized for the user, which page contains advertising information and links to other web sites in accordance with the present invention.

With reference to FIG. 1, a user at a client terminal 101 is connected to an Internet Access Service Provider (IASP) 102 and thence to the Internet 103. The connection of terminal 101 to IASP 102 and Internet 103 can be made in various ways as, for example, through a voice-band modem (not shown) over conventional POTS lines through a Local Exchange Carrier (LEC) (not shown). Alternatively, the connection to the Internet can be made over ISDN facilities, through a cable modem over cable television transmission facilities, or through other wired or wireless facilities. Illustratively, IASP 102 can be an access provider such as AT&T WorldNet$^{SM}$ on-line service.

When the user at client terminal 101 specifies the URL address of a desired HTTP-formatted page supplied over the World Wide Web (WWW) from an Information Service Provider (ISP), the browser within client terminal 101 sends a request over the Internet 103 to the identified ISP, ISP 104 for example, for that specific page. The requested page, as identified by the user-inputted URL address, is in turn transmitted in packetized form back over the Internet 103 and through IASP 102 to terminal 101 for display on the user's client terminal 101. By sequentially inputting a series of URL addresses manually through the browser or by clicking the terminal's mouse on a hyperlink on one HTTP-formatted page to a next URL address, or through a combination of both, the user is able to navigate through an essentially endless number of URL-addressed pages of information at ISP 104 and any of the other ISPs, such as ISPs 105 and 106, connected to the Internet. A user can thus literally spend hours "surfing the Net" retrieving information, accessing on-line services, and engaging in on-line transactions. Some of the sites may provide information to the accessing user and may be sponsored by governmental agencies, educational facilities, news providers, etc. Others sites may be provided by various companies that provide information in combination with advertising the goods or services that they offer for on-line or off-line purchase. Examples of the latter may be sponsored by chambers of commerce, magazines, vacation destinations, etc. Even other sites may be purely commercial in nature and associated with a company or an individual which or who is advertising its goods or service as, for example, a movie company advertising its newest motion picture releases, or a major conglomerate such as Disney, which may advertise its theme parks, its motion pictures and TV productions, and the associated products it also sells such as video tapes other "Disney" merchandise. Often, some of these sites provide interactive games geared in combination with self-advertising the provider's products and/or services.

In accordance with the present invention, as the user at client terminal 101 "surfs the Net", he or she at some time decides to exit an information-seeking work context mode to enter a commercial context mode to view advertising of products, services, etc., specifically directed to him or her. As previously noted, an incentive may be given to the user by his or her Internet service provider to "visit" such an advertising repository. Such an incentive may be reduced Internet access charges, or the presentation of a special offer or discount for an advertised product or service only available to "visitors" to a certain site, which offers are not available to the general public. Specifically, in accordance with the present invention, a Content Server 108, comprising an HTTP Server 110 and an associated CAR server 111, is connected to the Internet 103 and is accessed by the user at client terminal 101 through that client terminal's browser program either by inputting the URL address of the Content Server 108 manually, through a bookmark, or by clicking on a special icon presented on the user's display by a browser that has been modified to display such an icon. When Content Server 108 receives a request from the user, the HTTP server 110 within recognizes the user either through the input of an ID by the user, or through a "cookie" previously provided to the user's browser by server 110 in a previous interaction. The received request is passed by HTTP server 110 to CAR server 111, which accesses an associated and cooperatively connected database 112 to dynamically configure an advertising page specifically for that user. In order to dynamically configure such a customized advertising page for the user, database 112 stores an electronic profile for each registered user. Such a profile indicates subject areas of interest of each user and a user's demographic data from which information a plurality of images, banners, video clips, sound clips, etc. from different advertisers are combined by CAR server 111 into an aggregated advertising page or pages with hyperlinks to the advertising sites of each of the combined advertisers.

Such a profile of interests and demographic data is provided by the user on-line when the user registers to have access to the customized advertising repository service or off-line through a slow-mail registration process. When registering on-line for first time for the service through HTTP server 110, a profile page, such as illustrated in FIG. 2 is returned to client terminal 101. By using the mouse to electronically check his or her interests, such as travel, sports, etc., and by inputting demographic information such one's marital state, age, number of children, their ages, etc., as well as other information, that user's profile is stored in user profile database 112. Using well known techniques for targeting advertising to audiences based on their stated interests and demographic data, particular advertisers of products and/or services from among those product and/or service providers who subscribe to the service as advertisers are selected by CAR server 111 from an associated subscribing advertisers database 113 to dynamically create a composite advertising page specifically for that individual user based on that user's profile stored in user profile database 112. Each time the user enters the commercial context mode a dynamically created and customized composite HTML-formatted page is then presented to him or her.

As an example, if a user indicates that he is married, has two children ages 12 and 10, is interested in travel and theme parks, and lives in New Jersey, a customized advertising page may at one time be configured comprising ads, banners, etc., for Disney World advertising their 25$^{th}$ Anniversary celebration, Delta Airlines advertising special rates to Internet users for trips to Orlando, Fla., Sea World, National Car Rental, Universal Studios, etc. On such a aggregate HTML-formatted page, hyperlinks are provided to each advertiser's individual site on the Internet. Thus, such individual advertiser's sites, 116–121, are accessible by the user by clicking on the image, banner, video clip, etc., on the composite page. When that same user accesses his customized advertising repository at a subsequent time, the page presented may comprise a composite of different individual advertisers based on other profile and demographic information of that same user. Thus, as another example, if the same user has indicated in his or her profile that he or she was also interested in new computer technology, a composite advertising page is presented to the user upon a subsequent visit to the CAR server that combines banners, images, etc., associated with a new computer magazine, an on-line computer hardware and/or software merchant, an upcoming computer convention in the user's local area, etc. Furthermore, the CAR server 111 may produce and store a record in database 112 associated with the user's profile that notes the combination of advertisers that were previously presented to the user. Thus, at each new visit to the customized advertising repository, the user will be presented with a different and new set of advertisers and/or special offers that was not previously presented.

It has heretofore been assumed that the composite advertising page configured by CAR server 111 comprises separate advertisements for products and/or services determined solely by the user's previously provided profile information stored in user profile database 112. By providing information relating to the Web sites visited by the user during the work context mode prior to entering the commercial context mode, at least some of the composite images, video clips, audio clips, etc. in the dynamically configured advertising page presented to the user upon entering the commercial mode can be associated with advertisers which have a nexus with the user's previously visited Web site(s). Thus, by modifying the browser program in client terminal 101 to provide information relating to the sites previously visited by the user to HTTP server 110 and CAR server 111, CAR server 111 will retrieve from the associated subscribing advertiser's database 113 the necessary images, etc., for dynamically formulating a composite page that may be in whole or in part determined by the subject matter content of such previously visited sites. By modifying the browser program in client terminal 101 to accumulate information relating to the user's browsing activities (i.e., the sites visited), such information is forwarded to HTTP server 110 and CAR server 111 when the user makes the request to enter the context mode by clicking the commercial icon, or enters the URL address of HTTP server 110. Thus, when entering the commercial context, the URL addresses of the last N sites visited by the user are provided together with the request to HTTP server 110. These URL addresses are translated by a URL to Subject Mapping database 114 into a set of keywords. A Subject to Advertisement Mapping database 115 is then used to determine which advertising is relevant for a particular subject area. When CAR server 111 receives a request from the user's browser to view advertising, the URLs of the previous N sites visited are converted to key words by database 114, and those key words are then used by database 115 to determine the appropriate associated advertisements to be retrieved from advertising database 113 and configured by CAR server 111 into a composite page that is formulated for the user. Alternatively, the browser program in client terminal 101 can directly access a URL to Subject Mapping database located elsewhere on the Internet to determine key words from each visited site. These key words are then passed together with the request to HTTP server 110 and CAR server 111 for accessing the relevant advertising from Subject to Advertisement Mapping database 115. For either arrangement, once the relevant advertising is determined from a Subject to Advertisement Mapping database, CAR server 111 determines which particular advertising images, banners, clips, etc., are to be associated with the user's previously visited Web sites, and incorporates these in the dynamically configured composite advertising page. Thus, for example, if the user has previously visited a site related to theater news, such as Playbill On-Line, the dynamically configured composite advertising page may include advertisements for specific Broadway plays or musicals. Further, by combining the context information of the previously visited site or sites with the context independent profile information, such as a user's interest in music, the dynamically configured composite advertising page may include advertisements for specific plays and musicals as well as advertisement by a record company promoting upcoming or new CD releases of music from such musicals.

As described hereinabove, when the user enters the commercial mode by clicking on the icon on his browser or by inputting the URL address of the HTTP server 110, the CAR server 111 then dynamically configures a composite HTTL-formatted advertising page for that user and delivers it over the Internet 103 to the user's client terminal 101. As an alternative, such composite advertising pages can be configured before the user enters the commercial mode and, using "push" technology, transmitted over the Internet to client terminal 101 for storage within a cache to be immediately ready for display to that user as soon as he or she enters the commercial mode. This can be arranged for either the non-context dependent embodiment or the context dependent arrangement described above. For the latter, the browser program in client terminal 101 periodically sends to HTTP server 110 the URL addresses of the sites accessed by the user through the browser program. Based on some sub-set of those sites and/or the user's profile, CAR server 111 dynamically configures a composite page, and pushes it to the browser program where it is cached for later retrieval by the user when he or she enters the commercial mode. As a further extension, the CAR server 111 can dynamically configure a plurality of different composite pages for the user, which are each pushed over the Internet to the user's client terminal where each is cached for later retrieval by the user.

Figure 3:
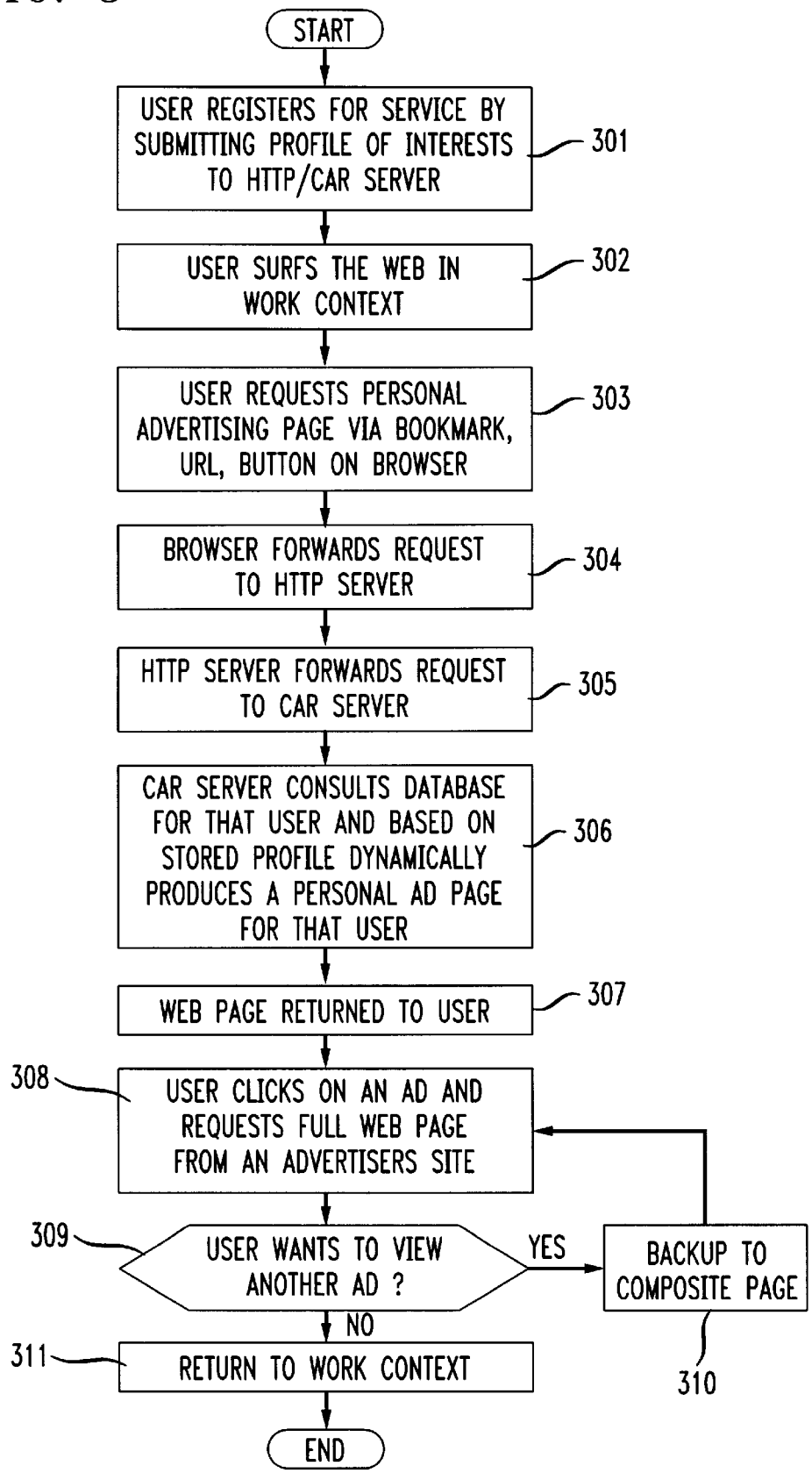
FIG. 3 is a flowchart of the steps associated with a non-context dependent embodiment of the present invention.

FIG. 3 illustrates the steps of the present invention for the non-context dependent embodiment described above. At step 301, the user registers for the service by submitting a profile of his or her interests to the HTTP server. At some later time, at step 302, the user begins to "surf the Web" in a work context. During the user's session, at step 303, a request is made through the user's browser for the individualized personal advertising page by entering the URL address of the HTTP server, manually or through a bookmark, or by clicking on a special icon button on the browser. At step 304, the browser forwards the user's request to the HTTP server. At step 305, the HTTP server forwards the received request to the CAR server. At step 306, the CAR server consults its associated database for the profile record associated with the user and, based on the stored profile, dynamically produces a personalized composite advertising page for the user. At step 307, the composite advertising page is returned to the user's browser. At step 308, the user clicks on an ad in the composite page to request a full Web page from the requested advertiser's own Web site. At step 309, the user decides whether to view another ad. If yes, at step 310, the browser is backed up to the composite page, and the process returns to step 308. If the user, at decision step 309, does not want to view another ad from the composite page, he or she returns to the work context by entering the URL address to the next site he or she wants to access.

FIG. 4 illustrates the steps of the present invention for the context dependent embodiment described above. As in the context independent embodiment of FIG. 3, the user, at step 401, registers for the service by submitting a profile of his or her interests to the HTTP server. At some later time, at step 402, the user begins to "surf the Web" in a work context. During the user's session, at step 403, a request is made through the user's browser for the individualized personal advertising page by entering the URL address of the HTTP server, manually or through a bookmark, or by clicking on a special icon button on the browser. At step 404, the browser forwards the user's request to the HTTP server together with the URL addresses of sites previously visited by the user in the current session. At step 405, the HTTP server forwards the received request to the CAR server. At step 406, the CAR server consults its associated database for the profile record associated with the user and, based on the stored profile, together with the context information associated with the previously visited sites, dynamically produces a personalized composite advertising page for the user. At step 407, the composite advertising page is returned to the user's browser. At step 408, the user clicks on an ad in the composite page to request a full Web page from the requested advertiser's own Web site. At decision step 409, the user decides whether to view another ad. If yes, at step 410, the browser is backed up to the composite page, and the process returns to step 408. If the user, at step 409, does not want to view another ad from the composite page, he or she returns to the work context by entering the URL address to the next site he or she wants to access.

Although the invention has been described in conjunction with providing commercial advertising to the user, the invention can also be applied to providing to the user any other type of information elements when the user exits a first work context mode and enters a second mode of work or entertainment. Thus the information elements presented that are dynamically composited, arranged and presented specifically for the user when the user exits the first work mode may be determined based on other characteristics of the user, such as the user's work habits, the user's financial investments, the user's entertainment choices, an alternate work project of the user, etc., and the banners, icons, etc., that make up the composite page do not necessarily have to relate to the advertisement of any product or service to the user. Rather, the information elements which are presented on a composite page are dynamically configured and presented expressly for that user based on some predetermined information relating to the user and/or the subject matter of those sites on the Internet that that user has previously visited.

The above-described embodiments are illustrative of the principles of the present invention. Other embodiments could be devised by those skilled in the art without departing from the spirit and scope of the present invention.

The invention claimed is:

1. A method of presenting a page of information for delivery over a packetized computer network to a user's browser program running on a client terminal comprising:

receiving a request for the page made from the user's browser program;

identifying the user making the request;

dynamically forming a composite page of information containing a plurality of information elements and associated hyperlinks to a plurality of other pages on the packetized computer network selected from a repository of a larger plurality of information elements and associated hyperlinks, the information elements and associated hyperlinks selected for the composite page being determined at least in part based on a stored previously provided profile associated with the identified user; receiving from the user's browser program a URL address of at least one site that the user's browser program visited before the request for the page is made, at least one information element and its associated hyperlink on the composite page being determined at least in part by subject matter content of the information at the URL address of the at least one site the user's browser program visited; and sending the composite page of information elements to the user's client terminal over the packetized computer network.

2. The method of claim 1 wherein the stored profile comprises subject topics of interest to the user.

3. The method of claim 2 wherein the stored profile further comprises demographic information associated with the user.

4. The method of claim 1 wherein at least one of the plurality of information elements on the composite page of information is associated with an advertised product or service and its associated hyperlink is to a URL address of a site on the computer network that is associated with a provider of the advertised product or service.

5. The method of claim 4 wherein the advertisement for a product or service is displayed using one or more of the following presentational techniques: a static banner, a streaming banner, a static image, an icon, a multidimensional image, a video clip, and an audio clip.

6. The method of claim 1 wherein the packetized data network is the Internet.

7. The method of claim 1 further comprising:

associating the URL address of the at least one visited site with at least one keyword related to the information content of the visited site;

associating the at least one keyword with at least one information element and associated hyperlink in the larger repository of information elements and associated hyperlinks; and selecting for inclusion in the composite page the information element associated with the at least one keyword.

8. A method of providing customized advertising to a user of a client terminal that is connected to the Internet and is running an Internet browser program comprising:

receiving a request from the browser program to view a page of advertising;

identifying the user;

dynamically configuring a composite page of advertising comprising a plurality of advertising images and associated hyperlinks to sites at other URL addresses on the Internet selected from a repository of a larger plurality of advertising images and associated hyperlinks, the advertising images and associated hyperlinks selected for the composite page being determined at least in part based on a stored previously provided profile associated with the identified user;

receiving from the user's browser program a URL address of at least one site that the user's browser program has visited before the request for the advertising page is made, at least one advertising image and its associated hyperlink on the composite page being determined at least in part by subject matter content associated with the information at the URL address of the at least one site the user's browser program visited; and sending the composite page of advertising via the Internet to the browser program running on the user's client terminal.

9. The method of claim 8 further comprising:

receiving the profile from the identified user; and storing the profile.

10. The method of claim 8 wherein the stored profile comprises subject topics of interest to the user.

11. The method of claim 11 wherein the stored profile comprises demographic information associated with the user.

12. The method of claim 8 wherein the composite advertising page is configured based on the user's profile and is pushed to the user's browser program over the Internet for storage in a cache before the request is received.

13. The method of claim 8 wherein a plurality of composite advertising pages are configured based on the user's profile and pushed to the user's browser program over the Internet for storage in a cache before the request is received.

14. The method of claim 8 wherein the hyperlink associated with at least one of advertising image on the composite page is to a URL address of a site on the Internet of a product or service provider associated with the at least one advertising image.

15. The method of claim 8 wherein the advertising image uses one or more of the following presentational techniques: a static banner, a streaming banner, a static image, an icon, a multi-dimensional image, a video clip, and an audio clip.

16. The method of claim 9 further comprising:

associating the URL address of the at least one visited site with at least one keyword related to the information content of the visited site;

associating the at least one keyword with at least one advertising image and associated hyperlink in the larger repository of advertising images and associated hyperlinks; and selecting for inclusion in the composite page the advertising image associated with the at least one keyword.

17. A customized advertising server connected to the Internet comprising:

means for receiving a request from a user's browser program to view a page of advertising;

means for identifying the user making the request;

a profile database for storing a profile of the user;

a database repository of a plurality of advertising images and associated hyperlinks;

means for dynamically configuring a composite page of advertising comprising a plurality of advertising images and associated hyperlinks to sites at other URL addresses on the Internet selected from the database repository of advertising images and associated hyperlinks, the advertising images and associated hyperlinks selected for the composite page being determined at least in part based on the user's profile stored in the profile database; and means for receiving from the user's browser program a URL address of at least one site that the user's browser program has visited before the request for the advertising page is made, the means for dynamically configuring a composite page selecting for inclusion on the composite page at least one advertising image and its associated hyperlink that is determined at least in part by subject matter content associated with information at the URL address of the at least one site the user's browser program visited.

18. The server of claim 17 wherein the user's stored profile comprises subject topics of interest to the interest to the user.

19. The server of claim 18 wherein the user's stored profile comprises demographic information associated with the user.

20. The server of claim 19 further comprising:

a URL-to-keyword database for associating the URL address of the at least one visited site with at least one keyword related to the information content of the visited site;

a keyword-to-advertising database for associating the at least one keyword with at least one advertising image and associated hyperlink in the larger repository of advertising images and associated hyperlinks; and means for selecting for inclusion in the composite page the advertising image associated with the at least one keyword.

* * * * *